(12) United States Patent
Hapner et al.

(10) Patent No.: US 6,598,917 B1
(45) Date of Patent: Jul. 29, 2003

(54) DOUBLE ROLLER ROBOT WHEEL GRIPPER BRACKET

(75) Inventors: Terry Hapner, Huntington, IN (US); Tracy Williams, Huntington, IN (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/871,927

(22) Filed: Jun. 1, 2001

Related U.S. Application Data
(60) Provisional application No. 60/284,423, filed on Apr. 17, 2001.

(51) Int. Cl.[7] .......................... B60C 25/00; B60B 33/00
(52) U.S. Cl. ...................... 294/86.4; 294/902; 157/1.36; 269/909; 901/39
(58) Field of Search ............................ 294/86.4, 86.41, 294/87.1, 90, 93, 106, 119.1, 902; 29/894.353; 269/265, 268, 270; 414/736, 739, 741, 783; 901/31, 39

(56) References Cited

U.S. PATENT DOCUMENTS

| | | | | |
|---|---|---|---|---|
| 3,057,654 A | * | 10/1962 | Beauchamp | ................ 294/106 |
| 3,438,510 A | * | 4/1969 | Fawell | ................ 294/119.1 X |
| 4,250,936 A | * | 2/1981 | du Quesne | ................ 157/1.24 |
| 4,345,866 A | * | 8/1982 | Greene | ................ 294/119.1 X |
| 4,363,175 A | * | 12/1982 | Hedahl | ................ 33/288 |
| 4,377,038 A | * | 3/1983 | Ragan | ................ 33/203.18 |
| 4,408,379 A | * | 10/1983 | Kusano et al. | ........ 29/894.353 |
| 4,544,193 A | | 10/1985 | Dunn et al. | |
| 4,546,681 A | * | 10/1985 | Owsen | ................ 294/116 |
| 4,653,793 A | * | 3/1987 | Guinot et al. | ........... 294/902 X |
| 4,697,838 A | | 10/1987 | Hartman | |
| 4,808,898 A | | 2/1989 | Pearson | |
| 4,815,216 A | * | 3/1989 | Swayne | ................ 33/203.18 |
| 5,120,101 A | * | 6/1992 | Vranish | ................ 294/902 X |
| 5,184,861 A | * | 2/1993 | Voellmer | ................ 294/119.1 |
| 5,219,263 A | | 6/1993 | Stuckmann et al. | |
| 5,242,202 A | * | 9/1993 | Ettinger | ................ 294/119.1 X |
| 5,253,911 A | | 10/1993 | Egan et al. | |
| 5,267,380 A | * | 12/1993 | Ronge et al. | ............. 33/203.12 |
| 5,520,501 A | * | 5/1996 | Kouno et al. | ......... 294/119.1 X |
| 5,536,056 A | | 7/1996 | Clarke et al. | |
| 5,851,041 A | * | 12/1998 | Anderson et al. | ........... 294/106 |
| 5,871,248 A | | 2/1999 | Okogbaa et al. | |
| 5,987,761 A | * | 11/1999 | Ohnesorge | ................ 33/203.18 |
| 6,199,928 B1 | | 3/2001 | Bilsing | |
| 6,422,097 B1 | * | 7/2002 | Menard et al. | ................. 157/1 |
| 6,422,285 B1 | * | 7/2002 | Gonzaga | .................... 157/1.24 |

FOREIGN PATENT DOCUMENTS

| | | | | |
|---|---|---|---|---|
| DE | 195 35 380 | * | 3/1997 | |
| JP | 26485 | * | 2/1991 | ................ 294/902 |
| JP | 407290158 | * | 11/1995 | |
| SU | 1135642 | * | 1/1985 | ................ 294/902 |

* cited by examiner

Primary Examiner—Eileen D. Lillis
Assistant Examiner—Paul T. Chin
(74) Attorney, Agent, or Firm—MacMillan, Sobanski & Todd, LLC

(57) ABSTRACT

A device for clamping onto an end of a wheel casting rim and transporting the wheel casting includes a pair of movable arms mounted upon an end of a robot arm. A pair of brackets are mounted upon the ends of each arm. A roller is mounted upon each end of each bracket. The rollers engage a flange formed upon the end or the wheel rim casting. The arms are contracted toward one another to clamp the wheel casting between the rollers.

7 Claims, 6 Drawing Sheets

DOUBLE ROLLER ROBOT WHEEL GRIPPER BRACKET

CROSS REFERENCE TO RELATED APPLICATIONS

This application claims the benefit of U.S. Provisional Application No. 60/284,423, filed on Apr. 17, 2001.

BACKGROUND OF THE INVENTION

This invention relates in general to manufacture of cast metal wheels and in particular to equipment for handling wheel castings.

Vehicle wheels formed from light weight metal alloy have become quite popular. Such wheels typically include an annular wheel rim that carries a pneumatic tire. The wheel rim has a recessed center portion that facilitates mounting the tire upon the wheel. The inboard and outboard ends of the rim include tire bead seats that support the tire walls. Additionally, radially extending wheel flanges are formed on the ends of the rim to retain the tire upon the wheel.

A circular wheel disc extends across the outboard end of the wheel rim. The wheel disc typically has a central hub that is supported within the rim by a plurality of radially extending spokes. A central pilot hole and a plurality of wheel mounting holes are formed through the wheel hub. The mounting holes are equally spaced about a circle that is coaxial with the pilot hole. The pilot hole is used to position the wheel upon the end of a vehicle axle while the mounting holes receive wheel studs that co-operate with wheel nuts to secure the wheel upon the vehicle. The wheel disc can be cast integrally with the wheel rim to form a one piece wheel.

Manufacturing processes for vehicle wheels are highly automated. Typically, molten metal is poured into wheel molds mounted upon a casting machine. The wheel molds can be mounted upon a rotating carousel to increase casting efficiency. Once the metal solidifies, the casting is removed from the mold and heat treated. The heat treated casting is oversized and requires machining to a final shape and size. The machining is usually accomplished by using multiple work stations. Thus, the wheel casting may first be placed upon a wheel lathe for turning the wheel rim and facing the wheel disc. The wheel casting can then be transferred to a drilling machine for boring the pilot and mounting holes through the wheel hub.

Wheel manufacturing time and costs have been reduced by utilization of robots to move the wheel castings between work stations. Such robots typically have a movable arm that is mounted upon a stationary pedestal. A device for gripping a wheel is mounted upon the end of the robot arm. The wheel gripper device securely grasps an end of the wheel rim. The arm then swings and elevates while contracting or extending to move the wheel casting between work stations.

Referring now to the drawings, there is shown in FIG. 1 an end view of a finished vehicle wheel 10 held by a prior art wheel gripper device 12. The wheel gripper device 12 includes a pair of opposed arms 14. The arms 14 are moveably mounted on the end of a conventional robot arm 13 and can be moved toward and away from each other, as illustrated by the small double headed arrows in FIG. 1. As best seen in FIG. 2, a bracket 15 is mounted upon the end of each of the arms 14. In FIG. 2, the gripper 12 is illustrated with a wheel casting 18 that includes inboard and outboard wheel tire bead retaining flanges, 20 and 22, respectively. The casting 18 is shown in section with the finished machined shape of the wheel outlined by dashed lines. Each of the brackets 15 includes a body 16 that is attached to an end of one of the arms 14. A single roller 24 is rotatably mounted upon an end of each of the bodies 16. A V-shaped groove 26 is formed in the circumference of each of the rollers 24.

During operation, the gripper arms 14 are extended until the rollers 24 enter the plane of the inboard casting wheel flange 20. The gripper arms 14 are then contracted toward one another causing the V-shaped grooves 26 in the rollers 24 to receive the edge of the flange 20. The rollers 24 rotate as needed to position the arms 14 relative to the casting 18. The arms 14 continue to contract toward one another until the casting 18 is securely clamped between the rollers 24. The robot arm 13 then moves to position the casting 18 upon a wheel lathe chuck (not shown). The wheel lathe chuck clamps onto the casting 18, whereupon the gripper arms 14 are extended away from one another to release the casting 18. The robot arm 13 withdraws the gripper arms 14 and brackets 15 from the casting 18. The wheel lathe then proceeds to turn the wheel rim and face the wheel disc to final shape and size.

Once the wheel lathe operations are completed, the robot arm 13 removes the casting from the lathe chuck by gripping the outboard wheel flange 22, as illustrated in FIG. 3. Components shown in FIG. 3 that are the same as components shown in FIG. 2 have the same numerical identifiers. The robot arm 13 then removes the casting 18 from the wheel lathe and transports the casting 18 to a drilling machine for boring the pilot and mounting holes. The robot arm 13 positions the casting 18 upon the drilling machine. After the casting 18 is mounted upon the drilling machine, the arms 14 are extended from one another to release the casting 18. The robot arm 13 is again withdrawn. When the drilling operations are completed, the robot arm 13 removes the machined wheel from the drilling machine and moves it to the next work station.

SUMMARY OF THE INVENTION

This invention relates to improved equipment for handling wheel castings.

When a wheel casting is heat treated, the thinness of the wheel rim may allow the inboard end of the rim to distort. As a result, it is difficult to consistently load wheel castings onto a wheel lathe chuck by gripping the inboard end of the casting rim such that the wheel casting is coaxially mounted upon the chuck. Accordingly, the concentricity and static imbalance of the resulting wheel can be degraded. Because the outboard end of the wheel casting rim includes a portion of the wheel disc, it is thicker and retains circularity better than the inboard end of the rim during heat treatment. Accordingly, it would be desirable to grip the wheel castings by the outboard wheel flange for loading onto the wheel lathe chuck.

The present invention contemplates an improved gripper bracket having a bracket for gripping a wheel that includes a body that is adapted to be mounted upon a robot arm. A pair of rollers are rotatably mounted upon opposite ends of the body. The bracket body is symmetrical about a plane that passes transversely through the center of the body. Also, each of the rollers has a groove formed in the circumference thereof. In the preferred embodiment, the roller groove has a V-shape. Additionally, the bracket has a recess formed therein that is adapted to receive the robot arm.

The invention also contemplates a device for clamping onto and transporting a vehicle wheel that includes a pair of spaced apart arms adapted to be movably mounted upon an end of a robot arm. The device also includes a plurality of brackets, with a bracket mounted transversely upon each end of each of the spaced apart arms. A pair of rollers are mounted upon each of the bracket bodies with one of the pair of rollers mounted upon each end of each of the bracket bodies. Each of the rollers lies in one of two spaced apart planes that are parallel to the spacer arms. The arms are movable relative to a wheel casting for the rollers to contact a portion of the wheel casting and clamp the wheel casting therebetween.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 4:
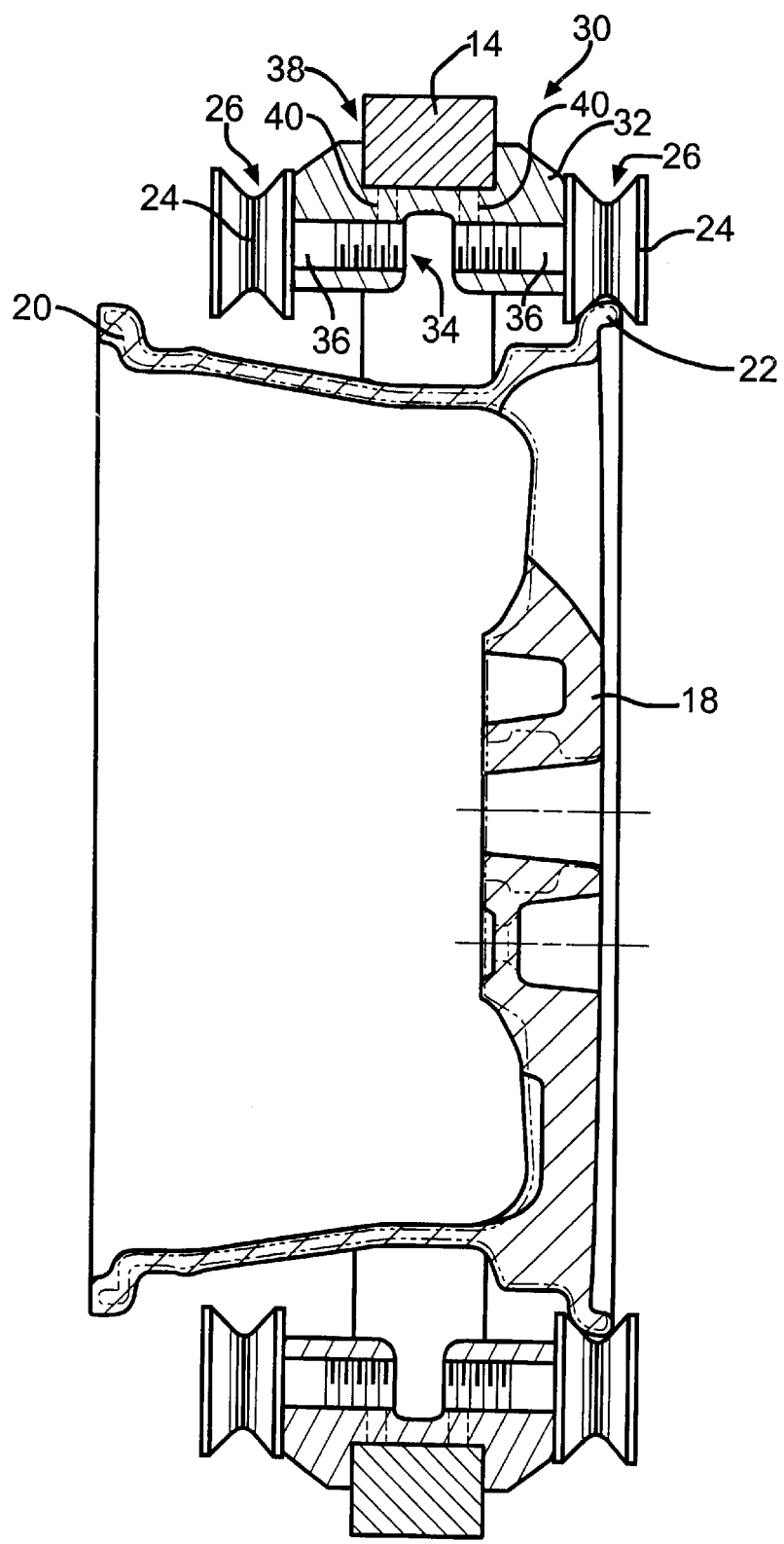
FIG. 4 is a sectional view of the wheel shown in FIG. 1 taken along line 2—2 with an improved wheel gripper device that is in accordance with the invention clamped upon the inboard wheel flange.

Referring again to the drawings, there is illustrated in FIG. 4, an improved wheel gripper device bracket 30 that is in accordance with the present invention. Components shown in FIG. 4 that are the same as components shown in the preceding drawings have the same numerical identifiers. The improved bracket 30 has a body 32 that is symmetrical about a plane passing through the body 32 such that the ends of the body 32 are mirror images of one another. The shape of the body 32 is selected to be compatible with the particular wheel lathe and drilling machine to allow loading of the wheel castings onto the machines. A bore 34 extends longitudinally through the body 32. In the preferred embodiment, the bore 34 is threaded and receives a pair of bolts 36.

The bolts 36 retain a pair of rollers 24 with one roller 24 mounted upon each end of the body 32. In the preferred embodiment, each of the rollers 24 includes a V-shaped groove 26 formed in its circumference; however, the invention also can be practiced with other shaped grooves (not shown). While bolts 36 are shown in FIG. 4, it will be realized that the rollers 24 can be retained on the bracket ends by other means, such as for example, a pin that extends through the bore 34 and the center of each of the rollers 24. Similarly, depending upon the mounting structure utilized for the rollers 24, the bore 34 may not be threaded.

A transverse notch 38 is formed in the upper surface of the bracket 32 body perpendicular to the longitudinal bore 34. The notch 38 receives the end of one of the gripper arms 14. In the preferred embodiment, a pair of threaded bores 40 extend into the bracket body 32 from the base of the notch 38. The bores 40 receive threaded fasteners (not shown) that pass through the end of the arm 14 and secure the bracket 30 to the arm 14.

Figure 1:
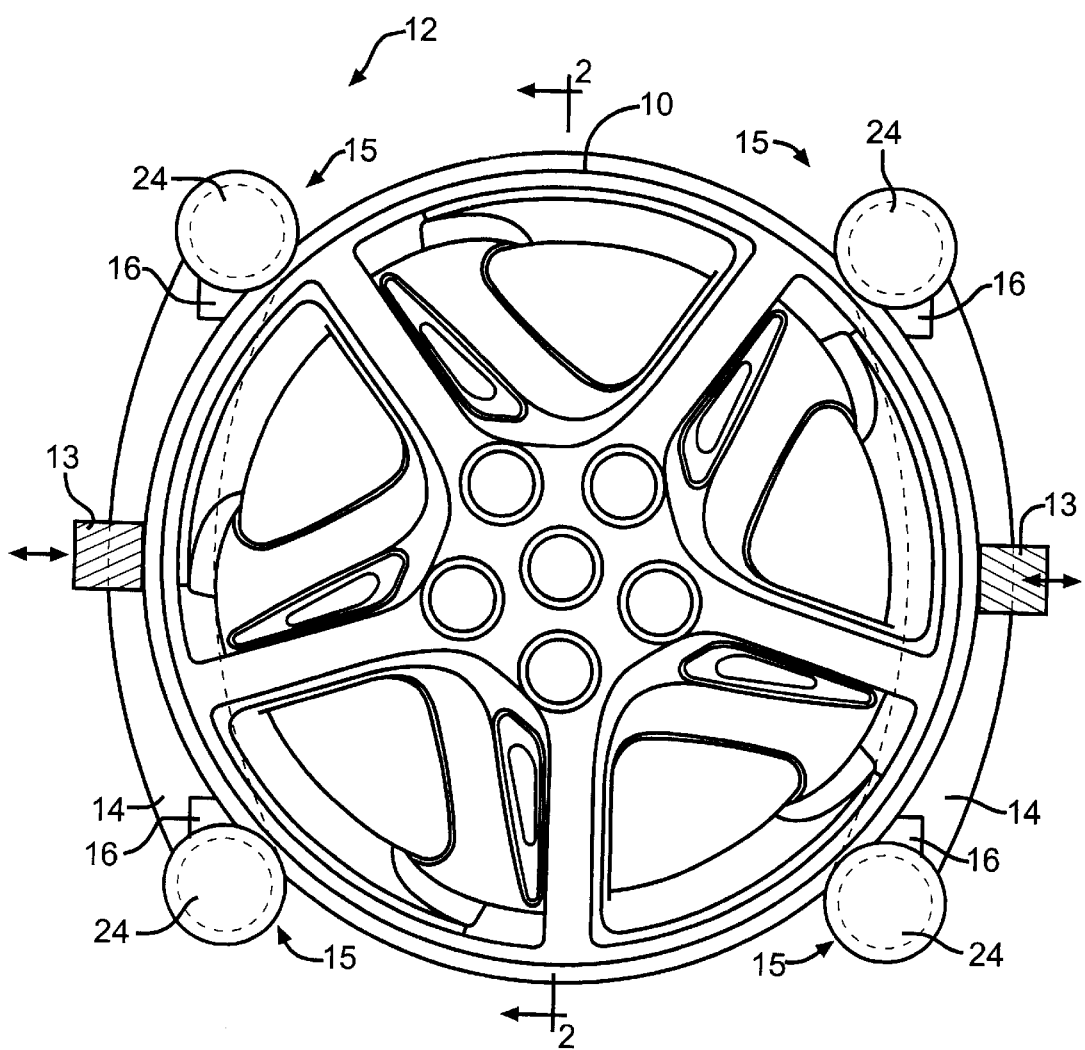
FIG. 1 is an end view of a wheel clamped by a prior art wheel gripper device.
Figure 2:
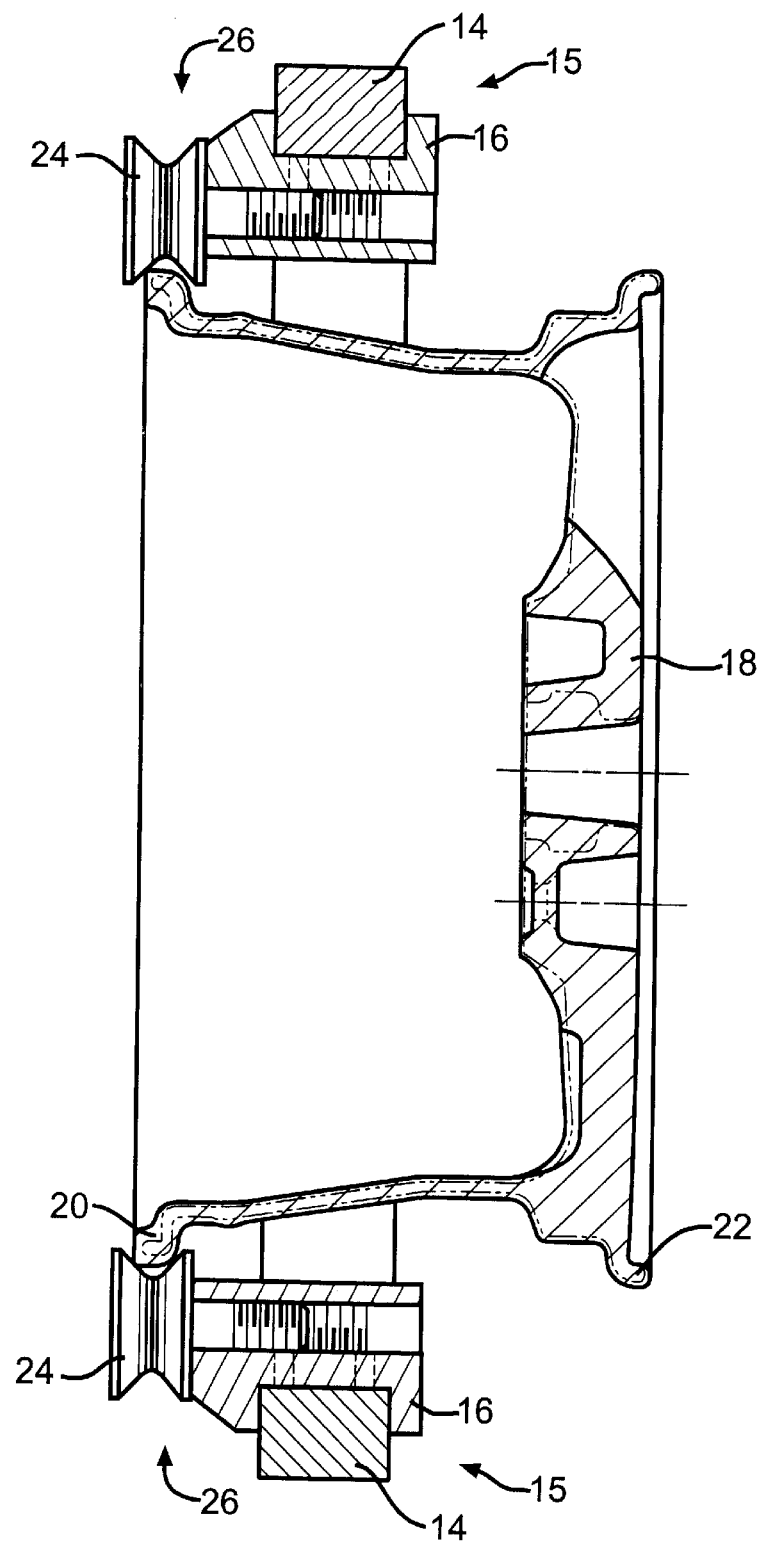
FIG. 2 is a sectional view of the wheel shown in FIG. 1 taken along line 2—2 with the prior art wheel gripper device clamped upon the inboard wheel flange.
Figure 3:
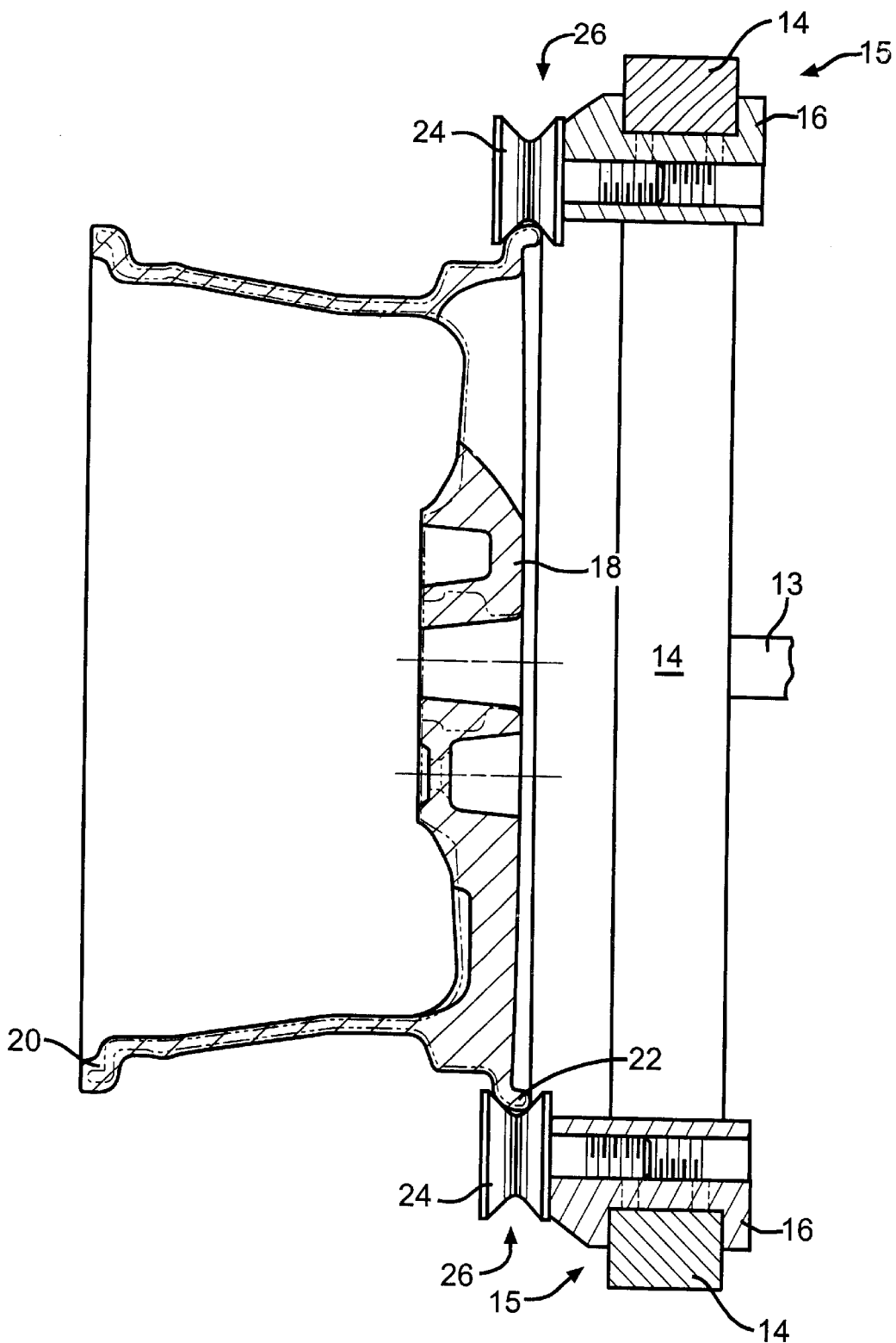
FIG. 3 is another view of the wheel shown in FIG. 2 with the prior art wheel gripper device clamped upon the outboard wheel flange.

The operation of the improved gripper bracket 30 will now be explained. The gripper arms 14 are extended until the rollers 24 mounted upon the right end of the bracket body 32, in FIG. 4, are in the plane of the outboard retaining flange 22 of the casting 18. The gripper arms 14 are then contracted toward one another causing the V-shaped grooves 26 in the right end rollers 24 to receive the edge of the outboard wheel flange 22. The rollers 24 rotate as needed to position the arms 14 relative to the casting 18. The arms 14 continue to contract toward one another until the casting 18 is securely clamped between the rollers 24, as shown in FIG. 1. The robot arm 13 then moves to position the casting 18 upon a wheel lathe chuck (not shown). The wheel lathe chuck clamps onto the casting 18, whereupon the gripper arms 14 are extended away from one another to release the casting 18. The robot arm 13 withdraws the gripper arms 14 and rollers 24 from the casting 18. The wheel lathe then proceeds to turn the wheel rim and face the wheel disc to final shape and size, as described above.

Figure 5:
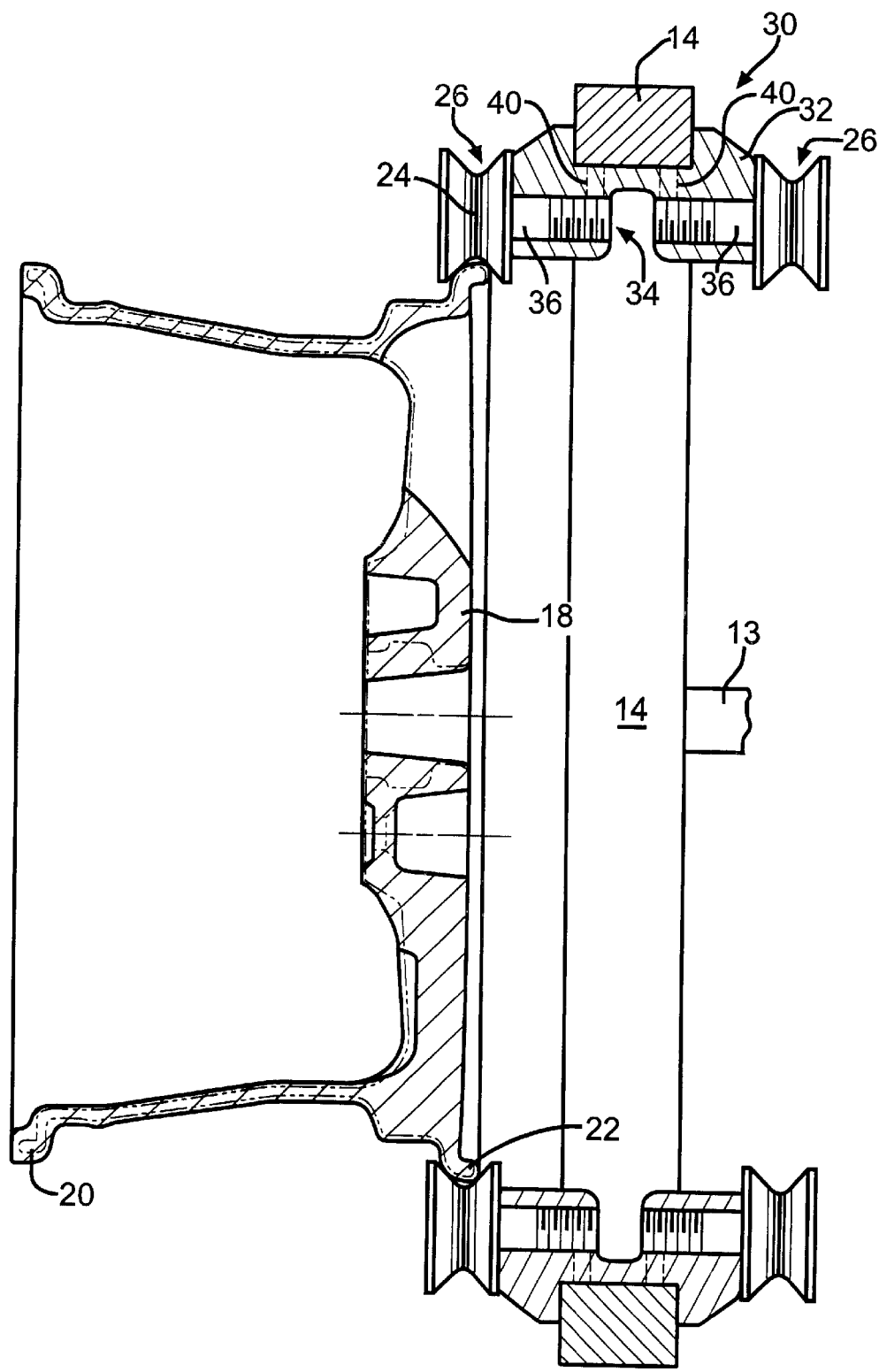
FIG. 5 is another view of the wheel shown in FIG. 4 with the improved wheel gripper device clamped upon the outboard wheel flange.

Once the wheel lathe operations are completed, the robot arm 13 removes the casting from the lathe chuck by again gripping the outboard wheel flange 22, as illustrated in FIG. 5. Again, components shown in FIG. 5 that are the same as components shown in the preceding figures have the same numerical identifiers. As can be seen in FIG. 5, during this operation, the gripper arms 14 are extended until the rollers 24 mounted upon the left end of the bracket body 32, in FIG. 5, are in the plane of the outboard retaining flange 22 of the casting 18. The gripper arms 14 are then contracted toward one another causing the V-shaped grooves 26 in the left end rollers 24 to receive the edge of the flange 22. The rollers 24 rotate as needed to position the arms 14 relative to the casting 18. The arms 14 continue to contract toward one another until the casting 18 is securely clamped between the rollers 24. The robot arm 13 then removes the casting 18 form the wheel lathe and transports the casting 18 to a drilling machine for boring the pilot and mounting holes. The robot arm 13 positions the casting 18 upon the drilling machine. After the casting 18 is mounted upon the drilling machine, the arms 14 are extended from one another to release the casting 18. The robot arm 13 is again withdrawn. When the drilling operations are completed, the robot arm 13 removes the machined wheel from the drilling machine and moves it to the next work station.

TEST RESULTS

Figure 6:
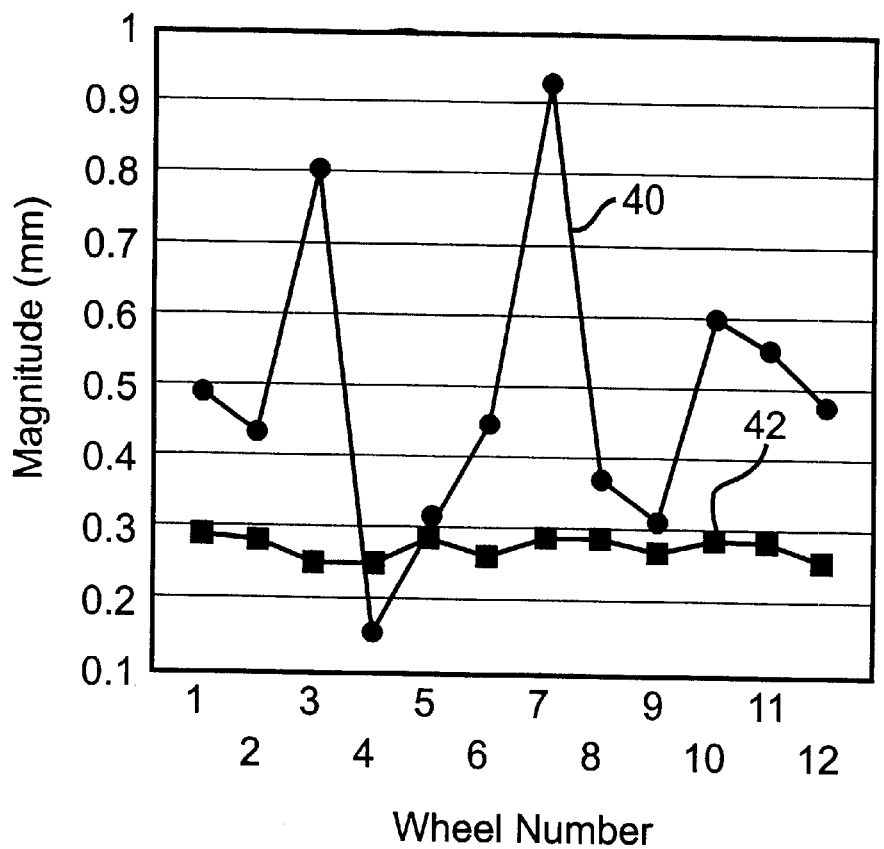
FIG. 6 is a graph illustrating the results of a test using the improved wheel gripper device.

The inventors have found that use of the improved double roller bracket 30 allows loading the wheel lathe for turning wheel rims by clamping onto the outboard wheel rim. Because the outboard end of the wheel rim casting tends to contain more metal than the inboard end, it usually has better circularity than the inboard wheel end following heat treatment. Accordingly, the inventors have found a greater consistency in loading the wheel lathe by gripping the outboard wheel flange and that the concentricity and static balance of the machined wheel is improved. During a test, a first set of 12 wheels was turned upon a wheel lathe that was loaded by a robot equipped with prior art brackets 15 that gripped the inboard wheel casting flange. The wheels were then drilled. After machining, the concentricity of each wheel in the first wheel set was measured. The results are shown by the line labeled 40 on the graph in FIG. 6. Similarly, a second set of 12 wheels was turned upon a wheel lathe that was loaded by a robot equipped with the improved brackets 30 that gripped the outboard wheel flange. The wheels were then drilled. After machining, the concentricity of each wheel in the second wheel set was measured. The results are shown by the second line, which is labeled 42, on the graph in FIG. 6. Clearly, use of the improved brackets 30 significantly improved the concentricity of the machined wheels and also improved the consistency of the machining operation. The inventors also found that the second harmonic of the machined wheel was improved with use of the improved brackets 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope. For example, while the use of only one wheel lathe has been described, the invention also can be utilized to transport a wheel casting between multiple wheel lathes. Thus, the gripper could clamp onto the outboard flange with the left end roller to load a first wheel lathe for turning the rim and then clamp onto the outboard flange of the partially machined casting to load the wheel casting onto a second wheel lathe for facing the wheel disc. Additionally, the invention also can be used to transport a wheel casting between other work stations than those described above.

What is claimed is:

1. A bracket for gripping a wheel for transport between work stations comprising:
   a body that is adapted to be mounted upon a robot arm; and
   a first pair of rollers rotatably mounted upon a first end of said body with each roller of said first pair of rollers carried upon an opposite side of first end of said body, each of said rollers having a circumferential groove formed therein, said groove adapted to receive a flange formed upon an end of a wheel casting; and
   a second pair of rollers rotatably mounted upon a second end of said body, said second end of said body being opposite from said first end of said body, with each roller of said second pair of rollers carried upon an opposite side of said second end of said body, each of said rollers having a circumferential groove formed therein, said groove adapted to receive a flange formed upon an end of a wheel casting.

2. A bracket according to claim 1 wherein said body is symmetrical about a plane that passes transversely through the center of said body.

3. A bracket according to claim 2 wherein said roller groove has a V-shape.

4. A bracket according to claim 3 wherein said body has a recess formed therein, said recess adapted to receive said robot arm.

5. A device for clamping onto and transporting a vehicle wheel comprising:
   a pair of spaced apart arms adapted to be movably mounted upon an end of a robot arm, each of said spaced apart arms having a first end and a second end opposite from said first end;
   a plurality of bracket bodies, with a single bracket body mounted transversely upon each of said first and second ends of said spaced apart arms, each of said bracket bodies being symmetrical about a plane that passes transversely through the center of said bracket body; and
   a plurality of pairs of rollers, each of said pairs of rollers mounted upon a corresponding one of said bracket bodies with each of the rollers in said pair mounted upon opposite ends of said corresponding bracket body and with said rollers that are mounted upon the same ends of said bracket bodies lying in one of two spaced apart planes that are parallel to said spaced apart arms, each of said rollers having a circumferential groove formed therein, said groove adapted to receive a flange formed upon an end of a wheel casting, said arms being movable relative to a wheel casting for one pair of said roller grooves on each arm to receive a portion of said wheel casting and clamp said wheel casting therebetween.

6. A clamping device according to claim 5 wherein said roller grooves have a V-shape.

7. A clamping device according to claim 6 wherein said bracket bodies are symmetrical about a plane that passes transversely through the center of each of said bracket bodies.

* * * * *